(12) United States Patent
Hsu

(10) Patent No.: US 6,259,059 B1
(45) Date of Patent: Jul. 10, 2001

(54) ARC WELDER AND TORCH FOR SAME

(75) Inventor: Christopher Hsu, Mentor, OH (US)

(73) Assignee: Lincoln Global, Inc., Monterey Park, CA (US)

( * ) Notice: Subject to any disclaimer, the term of this patent is extended or adjusted under 35 U.S.C. 154(b) by 0 days.

(21) Appl. No.: 09/468,073

(22) Filed: Dec. 21, 1999

(51) Int. Cl.$^7$ .................................................. B23K 9/09
(52) U.S. Cl. .............................. 219/130.51; 219/130.31; 219/137.61
(58) Field of Search ........................... 219/130.51, 130.1, 219/136, 137.7, 137.71, 137 PS, 130.21, 137.61, 130.31

(56) References Cited

U.S. PATENT DOCUMENTS

| | | | |
|---|---|---|---|
| 3,010,012 | * 11/1961 | Tuthill | 219/137.71 |
| 3,018,360 | * 1/1962 | Engel | 219/137.7 |
| 3,518,401 | * 6/1970 | Mathews | 219/130.51 |
| 3,590,213 | * 6/1971 | Caldwell | 219/136 |

* cited by examiner

*Primary Examiner*—Clifford C. Shaw
(74) *Attorney, Agent, or Firm*—Vickers, Daniels & Young

(57) ABSTRACT

In an electric arc welder for creating an arc welding process between a consumable electrode advancing through a contact tip and a workpiece, the welder including a power supply to create an arc current and arc voltage and having a first lead connected to the contact tip and a second lead connected to the workpiece, the improvement comprising dividing the contact tip into an upper tip section and a lower tip section with an insulator electrically isolating the sections, a first switch selectively shiftable to a conductive state connecting one of the power supply leads to said upper tip section, a second switch selectively shiftable to a conductive state connecting the one lead to the lower tip section and a switch operating network creating a first switch signal to shift the first switch to its conductive state and/or a second switch signal to shift the second switch to its conductive state to control the effective CTWD of the arc welding process.

65 Claims, 3 Drawing Sheets

US 6,259,059 B1

ARC WELDER AND TORCH FOR SAME

The present invention relates to the art of electric arc welding and more particularly to an arc welder and a unique welding torch for use in electric arc welding.

BACKGROUND OF INVENTION

Gas metal arc welding (GMAW) involves applying electrical current to a contact tip in a welding torch through which a consumable electrode or welding wire is passed as it moves toward a workpiece. Electrical current connected to the welding wire by the contact tip creates the electric arc for the welding process in accordance with standard welding technology. A power source, normally a high speed switching inverter, creates the welding current and is normally regulated on the basis of arc voltage to maintain a stable arc length in a constant voltage welding or pulse welding. The electrode or welding wire advancing through the contact tip toward the workpiece is electrically connected to the workpiece by the electric arc having a length that should have a given length for a specific process. The spacing between the contact tip and the workpiece is the welding parameter known as the contact tip to work distance (CTWD). This parameter is distinguished from the electrode stickout (ESO) which is the length of the advancing welding wire measured from the contact tip to the arc and includes a summatio of ESO and arc length. In gas metal arc welding it is desirable to control CTWD to maintain a stable are length. CTWD varies due to process disturbances, such as weldment dimensional tolerances experienced during production, tooling/fixture positioning accuracy and part distortion during welding. To compensate for CTWD variations and, thus, maintain arc stability, it is normal procedure in GMAW processing to adjust the arc current to change the heat input and, thus, vary the burn-off rate of the wire. Changing arc current, while maintaining voltage constant, leads to substantial changes in the heat input per unit length of the weld bead and substantially affects the cooling rate of weld pool solidification. Using variations in the heat input by changing the current to adjust for variations in CTWD or arc length, has been found to cause corresponding changes in the weld surface profile, penetration profile, base metal dissolution, metallurgical properties and mechanical properties in the weld bead. Consequently, changing the current in a constant voltage welding process to compensate for changes in CTWD presents substantial process variations exhibited primarily in the heat affected zone. Further, distortion level of the weldment and quality of the weld structure is more difficult to maintain when using arc current to compensate for changes in CTWD and, thus, in changes of arc length. To avoid the necessity of increasing or decreasing arc current based upon variations in CTWD, especially on robotic applications, the arc current is measured and used to mechanically adjust the actual spacing between the contact tip and the workpiece. This procedure is often employed in seam tracking of robotic welding equipment wherein the torch weaves back and forth as it moves along a seam. The CTWD at each end of the weave is compared to determine if the torch is centered in the joint. Variations cause a change in the path of the torch to track the seam.

Because of the mechanical inertia and the dependency on a feedback loop process when adjusting CTWD as well as heat differences, a method using the arc current for arc stability is not used, especially in a high speed welding application. Another arrangement for physically adjusting the spacing of the tip with respect to the workpiece is a vision system that actually scans the position of the tip with respect to the workpiece during the welding operation. Such vision systems are not employed due to high cost and maintenance in hostile environments. In summary, the most accepted way of maintaining arc stability is to adjust the welding or arc current to compensate for variations in CTWD. This presents the problems heretofore explained in detail.

BRIEF DESCRIPTION OF INVENTION

The present invention relates to a method of controlling CTWD without changing heat input and without physically moving the contact tip mechanically with respect to the workpiece. Since the procedure for controlling CTWD does not involve a feedback loop controlling welding current and does not involve physically moving the contact tip or torch with respect to the workpiece, the disadvantages experienced with respect to prior efforts to maintain CTWD during normal welding or seam tracking are alleviated. The invention maintains stable arc length in a constant voltage welding operation or pulse welding operation without disadvantages associated with the prior control procedures.

In accordance with the present invention there is provided a modification of the contact tip used in the welding gun or torch assembly. The invention involves separating the contact tip into two electrically isolated sections comprising an upper contact tip section and a lower contact tip section. The two tip sections are separated by an air gap or other insulator so that the consumable welding wire or electrode passes through first the upper tip section and then through the lower tip section as it advances toward the workpiece. The power supply of the welder that drives the torch or gun has one lead which is controlled by two power electronic switches to split the output current of the power supply. The arc current flows to either top or upper contact tip section or the bottom or lower contact tip section, or both sections, according to shifting the switches selectively into the respective conductive states. The total welding current is maintained with current passing through either the upper contact tip, the lower contact tip or both contact tips. When the welding current flows only to the upper contact tip, CTWD is the distance determined by the spacing of the upper contact tip from the workpiece. When current is directed to the bottom tip, CTWD is the spacing of the lower tip from the workpiece. Consequently, as the current is directed to the upper tip a greater CTWD is created than when the current is directed to the lower tip. In accordance with the invention, the current is time shared between the upper or top contact tip and the lower or bottom contact tip. In accordance with the preferred embodiment, a pulse width modulator operated at a low frequency, such as less than about 1 kHz, includes a controlled duty cycle. The output logic on the pulse width modulator causes the welding current to be directed to the upper tip or to the lower tip. There is time sharing basis based upon the duty cycle of the pulse width modulator. Consequently, detected CTWD of the welding process is not the distance from the lower contact tip or the upper contact tip. The "effective" CTWD a distance is somewhere between the spacing of the two contact tip sections based upon the time during which the welding current is directed to the upper tip or the lower tip. By increasing the time during which the welding current is directed to the upper tip, compared to the time the current is directed to the lower tip, the effective CTWD is increased. In a like manner, an increase in the time the current is directed to the lower contact tip compared to the upper contact tip, the effective CTWD is reduced. By merely adjusting the duty cycle of the pulse width modulator, the effective CTWD is changed to maintain the desired arc length and, thus, the stability of the welding process. Arc length and arc voltage is controlled by adjusting the duty cycle or relative switch operating times of the arc current time sharing network. When the torch assembly or gun is physically too close to the weldment, more current is directed to the upper contact tip section to reverse the effective torch-to-work distance. In a like manner, when the torch or gun is pulled away from the weldment, more current is directed to the bottom contact tip to maintain an effective CTWD to maintain the arc length and arc voltage for stability of the welding process.

Since there is no mechanical adjustment of the torch to adjust CTWD, response to changes in this parameter are quite rapid. There is no mechanical inertia. Consequently, the present invention can be applied to semi-automatic and completely automated or robotic applications. By introducing this extreme flexibility in controlling the welding process, the invention separates stability and arc length control from melting or heating generation control. Thus, the invention can adjust and maintain an effective CTWD without relying upon current control. Processed stability is thereby achieved while maintaining constant heat, constant wire melting, constant weld size, constant shape, constant metallurgical and mechanical properties and low weldment distortion. In equipment where the welding process employs seam tracking, the duty cycle of the pulse width modulator used to control CTWD will indicate the magnitude of the spacing to the workpiece. Consequently, the duty cycle of the pulse width modulator can be used as a feedback device to control the torch to work distance to provide seam tracking and adaptive fill of the weldment.

In accordance with the invention, there is provided an improvement in an electric arc welder for creating an arc welding process between a consumable electrode or wire advancing through a contact tip and a workpiece, where the welder includes a power supply to create an arc current and arc voltage. The power supply may take a variety of forms, but has a first lead connected to the contact tip and a second lead connected to the workpiece. The inventive improvement comprises dividing the normal contact tip into an upper tip section and a lower tip section with an insulator electrically isolating the sections. The insulator may be an air gap or ceramic insert through which the advancing wire passes as it is fed from the upper tip section, through the lower tip section toward the workpiece. In accordance with the invention there is provided a first switch selectively shiftable to a conductive state and connecting one of the leads from the power supply to the upper tip section, a second switch selectively shiftable to a conductive state connecting the one lead from the power supply to the lower tip section and a switch operating network creating a first switch signal to shift the first switch to the conductive state and/or a second switch signal to shift the second switch to its conductive state to control the effective CTWD of the arc welding process. According to the time sharing between the upper tip section and the lower tip section, the effective CTWD is adjusted. By using the invention, the CTWD can be maintained at a preselected value in a constant voltage welding operation without arc current adjustment.

In accordance with another aspect of the present invention, the switch operating network is a pulse width modulator with an output having a logic controlled by the duty cycle so that the output creates one switch signal which is inverted to create the other switch signal. Consequently, the duty cycle of the pulse width modulator determines the time sharing between current directed to the upper tip section and current directed to the lower tip section. In this manner, the effective CTWD is adjusted merely by changing the duty cycle of the pulse width modulator.

The primary object of the present invention is the provision of an electric arc welder where the CTWD can be adjusted without mechanically moving the welding torch and without changing the welding current.

Another object of the present invention is the provision of an electric arc welder, as defined above, which electric arc welder includes a contact tip divided into two sections separated by an insulator, such as an air gap or ceramic sleeve, so that a time sharing switch network can be used to change the effective CTWD of the welding process.

Yet another object of the present invention is the provision of a method of using the electric arc welder, as defined above, which method selectively directs welding current to an upper section of a divided contact tip, to a lower section of the divided contact tip or to both sections.

Still a further object of the present invention is the provision of a torch or gun assembly utilizing the concept of a divided contact tip, which torch can be used for time sharing of the electric arc welding current to adjust the effective CTWD without the need for mechanical adjustment or current modulation.

These and other objects and advantages will become apparent from the following description taken together with the accompanying drawings.

PREFERRED EMBODIMENT

Figure 1:
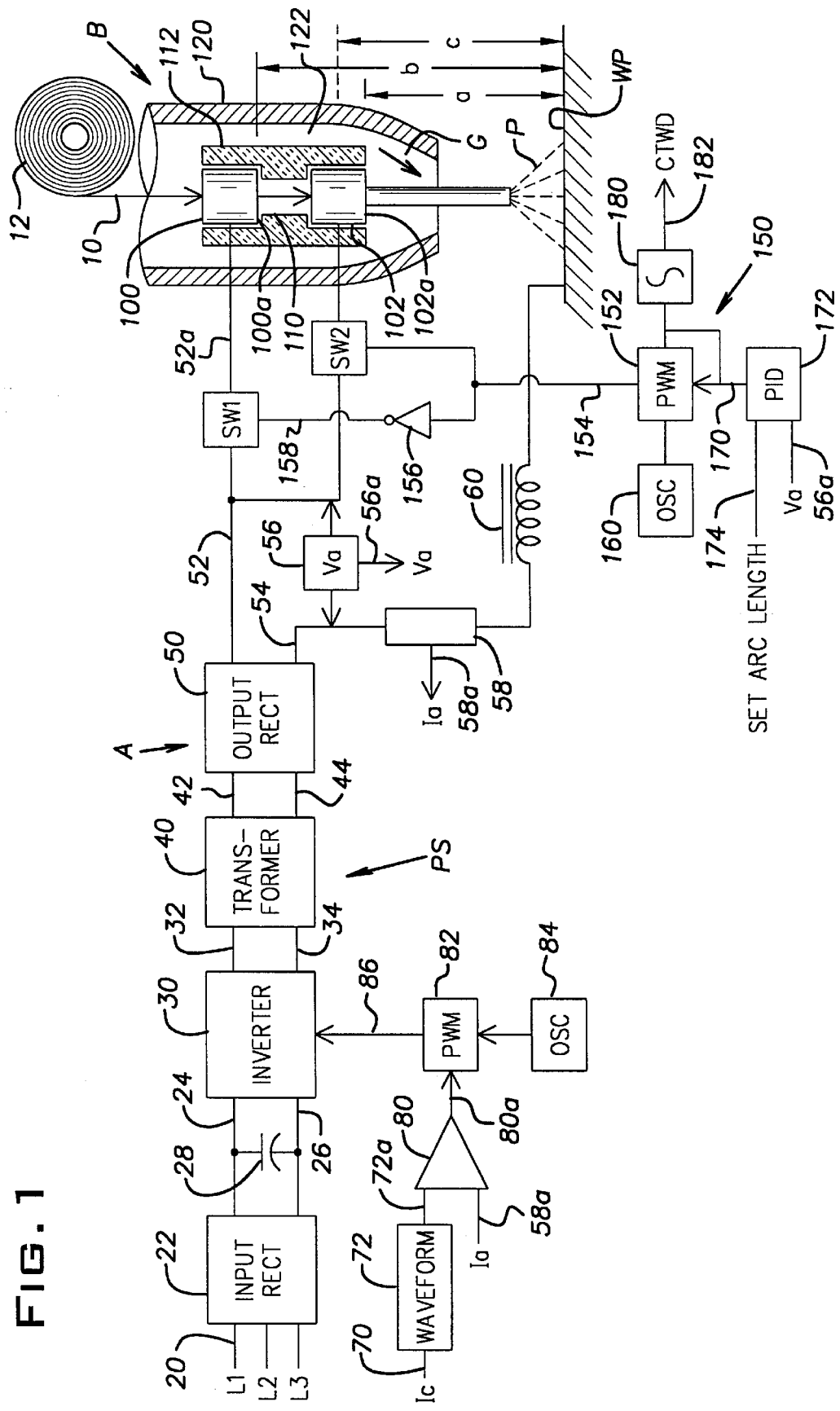
FIG. 1 is a wiring diagram combined with a schematic illustration of a torch or gun assembly constructed in accordance with the present invention.

Referring to the drawings wherein the showings are for the purpose of illustrating a preferred embodiment of the invention only and not for the purpose of limiting same, FIG. 1 shows an electric arc welder A of the constant voltage type for providing weld current to torch or welding gun B so the torch can perform a welding operation. A consumable electrode or wire 10, supplied by a standard spool 12 and directed through the torch or gun B toward a workpiece WP, is melted at arc P. When the arc melts the end of wire 10 the molten metal is transferred to a weld bead on workpiece WP.

Power supply PS is not a part of the invention and is arranged in accordance with somewhat standard architecture. In the illustrated invention it is an inverter unit; however, a traditional non-inverter power supply can be used. A three phase input 20 drives input rectifier 22 to produce a DC voltage across leads 24, 26 on opposite terminals of filter capacitor 28. A high speed switching type inverter 30 converts the DC voltage on leads 24, 26 into an AC output across lines 32, 34 connected to the primary winding of transformer 40. Secondary windings of the transformer produce an AC voltage across leads 42, 44. The AC voltage across these leads is converted to a DC current by output rectifier 50 having output leads 52, 54 for driving the welding process performed between welding wire 10 carried by torch B and workpiece WP. In accordance with standard practice, the DC voltage $V_a$ across leads 52, 54 is sensed by circuit 56 while the arc current $I_a$ is sensed by circuit 58 shown as a shunt, but a Hall Effect sensor can be used. To maintain a smooth DC current, choke 60 is provided in output lead 54, which lead is connected to workpiece WP. Lead 52 is connected to the contact tip mechanism in torch B, which tip mechanism is constructed in accordance with the present invention. To maintain the desired current through consumable electrode or wire 10, a current command signal $I_c$ is applied to line 70 constituting the input of wave form circuit 72. This circuit controls the wave shape of the current in the electric arc welding process. Output 72a of wave form circuit 72 is the current command signal controlling the wave shape of the welding process between electrode 10 and workpiece WP. This command signal is compared with the sensed arc current Ia on line 58a by error amplifier 80. In practice, the invention is implemented digitally and amplifier 80 is a PID block. The error amplifier concept is illustrative in nature and is consistent with normal representation of a closed loop controller. Output 80a of amplifier 80 is the voltage input to the power supply pulse width modulator 82 for controlling the width of the pulses. The power supply pulses have a frequency controlled by oscillator 84, which frequency is generally in excess of about 20 kHz. Pulses in line 86 control the switching network in inverter 30 to create the desired AC voltage across output lines 32, 34 to thereby control the current in the welding process. As so far described, electric arc welders A and gun B are the same as standard welders and torches for melting electrode 10 onto workpiece WP.

In accordance with the present invention the contact tip mechanism of torch or gun assembly B is divided into an upper tip section 100 with a lower end 100a and a lower tip section 102 with a lower end 102a. In accordance with standard contact tip operation, wire 10 passes through sections 100, 102 which are isolated by an air gap 110, which gap is filled with a spacer 112 formed from ceramic or other electric insulation material. In the illustrated embodiment, spacer 112 is a part of ceramic sleeve 114 separating contact tip sections 100, 102 from an outer metal housing 120 defining a shielding gas passage 122 for shielding gas G, such as carbon dioxide, argon or mixtures thereof. The contact tip for directing current from lead 52 to advancing welding wire 10 is divided into two vertically spaced tip sections to create a first CTWD having a distance a determined by lower tip 102 and a second CTWD having a distance b determined by upper tip 100. In accordance with the invention, current from lead 52 is directed to tip sections 100, 102 in a time sharing arrangement determined by the conductive state of switches SW1, SW2. Output 52a of switch SW1 is connected to contact tip 100. In a like manner, output 52b of switch SW2 is connected to contact tip 102.

When switch SW1 is in a conductive state, current from lead 52 is directed to tip section 100. Current from this same lead is directed to tip section 102 when switch SW2 is in its conductive state. By operating switches SW1, SW2 during the welding process, the effective CTWD is controlled as distance c between distance a, and distance b. Thus, the effective CTWD is controllable according to the relative time that the welding current is passed through switches SW1, SW2. When both switches SW1, SW2 are closed or conductive at the same time, current from lead 52 passes through tips 100, 102 according to the impedance experienced by the current through the two separate branches. In summary, the welding process can be controlled to create the desired CTWD by operating switches SW1, SW2 during the welding operation at different times.

Time sharing for the upper contact tip section 100 and the lower contact tip section 102 can be controlled to obtain the desired effective CTWD by a variety of control schemes. In the preferred embodiment, the time sharing or switch operating network 150 includes a second pulse width modulator 152 having an output 154 for controlling the conductive state SW2 and inverter 156 creates an inverted output 158 for controlling the conductive state of switch SW1. Thus, a logic 1 in output 154 closes switch SW2 and opens switch SW1. A logic 0 in line 154 causes the opposite result. The pulses of the second pulse width modulator are created at a rate determined by oscillator 160. This rate is in the general range of 1 ms to 5 ms with oscillator 160 operated at less than about 1 kHz. The duty cycle is controlled by the voltage in line 170 which is the output of PID filter 172. This filter compares the set or desired arc length on line 174 with the arc voltage $V_a$ on line 56a. In accordance with the invention, the desired arc length signal on line 174 is compared with the actual voltage on line 56a to determine the duty cycle of pulse width modulator 152 to control the relative time that the welding current is directed to the respective spaced contact tip sections 100, 102. This produces an effective CTWD to stabilize the arc voltage and, thus, arc length. In accordance with another aspect of the invention, the duty cycle signal on output 170 of pulse width modulator 152 is integrated by integrator 180 to produce a signal in line 182. This signal represents the effective CTWD for the welding process and is used for seam tracking, as shown in FIG. 3.

Figure 2:
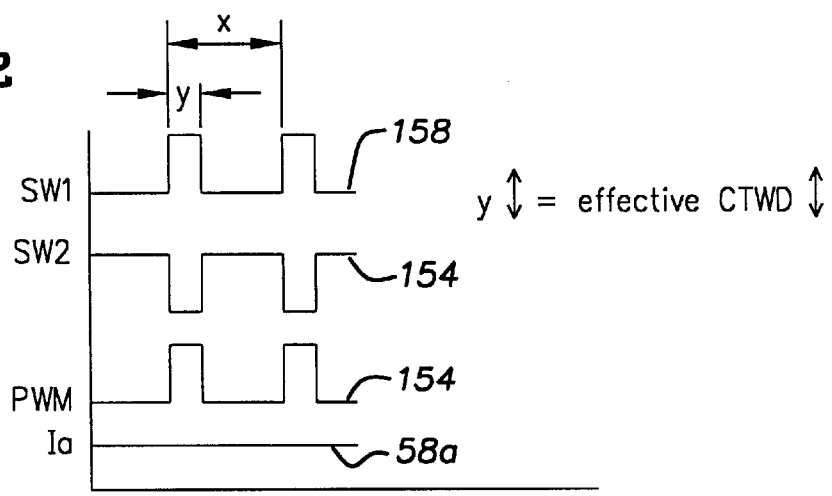
FIG. 2 is a current graph illustrating current sharing of the torch or gun assembly illustrated in FIG. 1 together with the voltage curve output of the pulse width modulator and a graph illustrating the welding current during the operation of the present invention.

Referring now to FIG. 2, oscillator 160 produces a pulse width x at the output of second pulse width modulator 154. Switch SW1 is conductive for the time y and the duty cycle is the ratio of x:y. By adjusting the width of pulse y, the effective CTWD is controlled. As illustrated in FIG. 2, adjustment of the effective CTWD does not affect arc current $I_a$ on line 58a, which current remains constant and need not be adjusted to correct CTWD.

Figure 3:
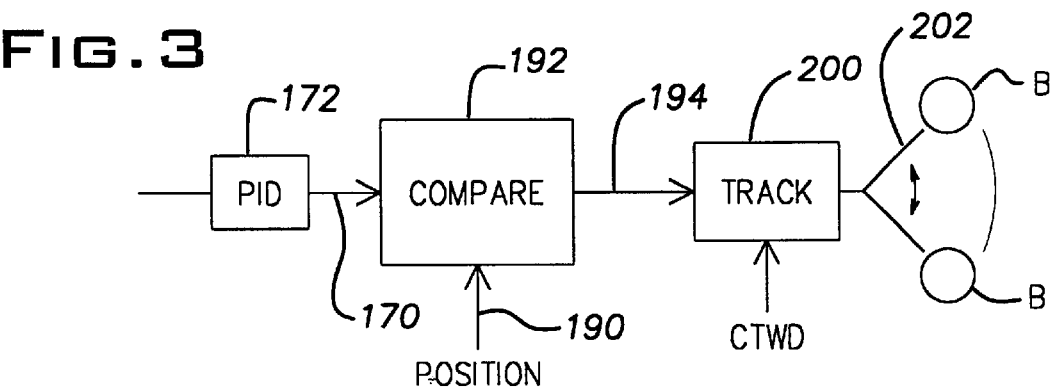
FIG. 3 is a block diagram illustrating the use of the present invention to control the position of a welding torch or gun assembly for seam tracking in the welding process.
Figure 3A:
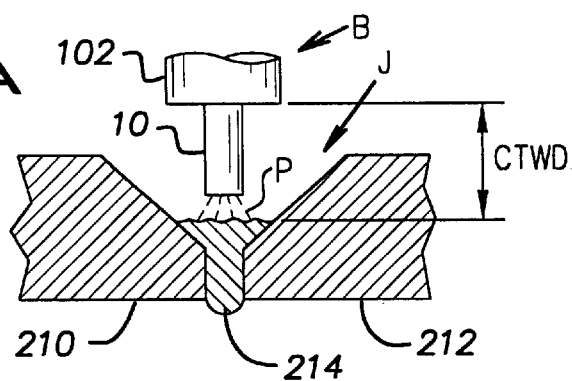
FIG. 3A is an enlarged cross sectional view of a welding torch of the type used in seam tracking employing the aspects of the invention illustrated in FIG. 3.

FIG. 3 illustrates the use of the effective CTWD signal in line 170 to control the tracking head 200 of a robotic automatic welder. As torch B is being weaved inside a joint J (See FIG. 3A), both the torch position from feed to arc line 190 and the effective CTWD on line 170 are compared in circuit 192. By determining the CTWD amplitude at opposite sides of the weave of torch B in joint J, an off-seam error signal is created in line 194. This signal is fed into a tracking device which applies offset to the originally planned torch path so the torch is maintained in the center of joint J. As the difference in effective CTWD differs due to deviation of the torch B from the center of the seam, tracking head 200 adjusts the position of torch B as indicated by the mechanism 202. This concept is illustrated in FIG. 3A, wherein torch B is used to track between workpieces 210, 212 for laying a bead 214. When there is a difference in effective CTWD at edges of joint J by circuit 192, torch B is not following the seam. Transverse movement of the torch repositions the torch.

Figure 4:
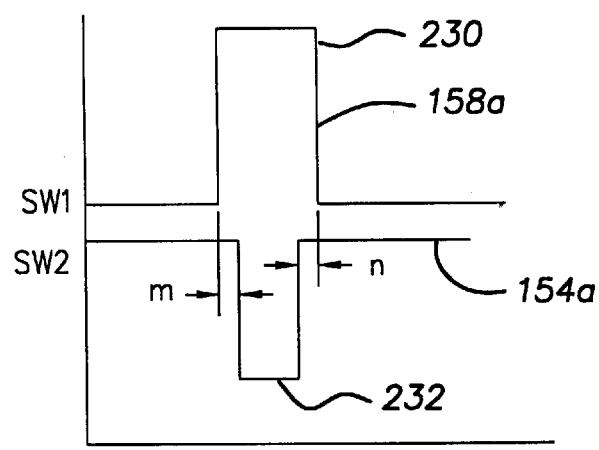
FIG. 4 is a graph illustrating current directed to the two divided tip sections of the torch illustrated in FIG. 1 with a current overlap concept obtained by using a signal generator as shown in FIG. 6.
Figure 5:
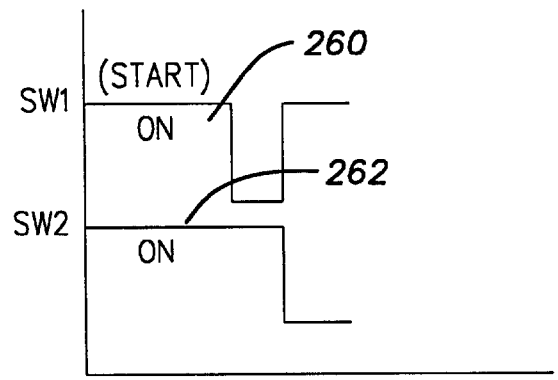
FIG. 5 is a graph similar to FIG. 4 illustrating operation of the present invention at the start of the welding process; and, FIG. 6 is a block diagram illustrating the use of a signal generator for controlling the switch signals creating the time sharing for the welding current used in the present invention.
Figure 6:
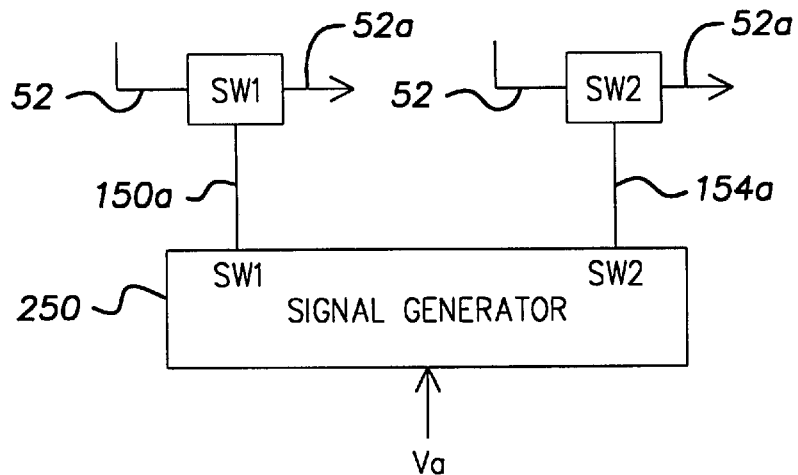

In accordance with an aspect of the invention, a signal generator 250, as shown in FIG. 6, creates signals in lines 154a, 158a to control switches SW2, SW1, respectively. The signal generator 250 has more versatility than pulse width modulator 152 used in the preferred embodiment of the invention. The signal generator allows a modification of the invention as shown in FIG. 4 wherein pulse 230 represents the conductive state of switch SW1. In a similar manner, negative pulse 232 is the time when switch SW2 is not conductive. This pulse can be reduced in size with respect to pulse 230 to produce an overlap at the initiation of switch SW1 and before switch SW1 is turned off. Overlap m, n in practice is in a range of 5–30 microseconds. In accordance with the invention, at least one switch SW1, SW2 is conductive at any given moment during welding. Normally the torch is started with switch SW2 closed to direct all current through lower tip section 102. However, to control transients it is within the invention to have both switches conductive at the same time. This feature is also shown in FIG. 5 where the starting pulse 260 for switch SW1 overlaps starting pulse 262 for switch SW2. At the start of the welding cycle, both switches SW1, SW2 are conductive to distribute the welding current to both tips 100, 102. Thereafter, the switching cycle can be changed by using a signal generator 250, or pulse width modulator 152. The switches are operated several times during a pulse of current in the pulse welding mode.

Having thus defined the invention, the following is claimed:

1. In an electric arc welder for creating an arc welding process between a consumable electrode advancing through a contact tip and a workpiece, said welder including a power supply to create an arc current and arc voltage and having a first lead connected to said contact tip and a second lead connected to said workpiece, the improvement comprising: said contact tip including an upper tip section and a lower tip section and an insulator that electrically isolates said upper and lower sections, a first switch selectively shiftable between a conductive state and a nonconductive state, said conductive state connecting first lead to said upper tip section, a second switch selectively shiftable between a conductive state and a nonconductive state, said conductive state connecting said first lead to said lower tip section, and a switch operating network creating a first switch signal to shift said first switch to its conductive state and/or a second switch signal to shift said second switch to its conductive state, said switch operating network including a control circuit that compares a set welding parameter to a monitored welding parameter and to create a first or second switch signal based on said comparison.

2. The improvement as defined in claim 1, wherein said switch operating network includes a pulse width modulator with an output having a controlled duty cycle, said output creating one of said switch signals and an inverter for converting said one switch signal to the other of said switch signals.

3. The improvement as defined in claim 2, wherein said control circuit creates an output with a duty cycle signal for adjusting said duty cycle to control the effective CTWD of said arc welding process.

4. The improvement as defined in claim 3, including means for reading said duty cycle to create a CTWD signal.

5. The improvement as defined in claim 3, wherein said set welding parameter including a set or selected arc length, said monitored welding parameter including the arc voltage.

6. The improvement as defined in claim 2, including means for reading said duty cycle to create a CTWD signal.

7. The improvement as defined in claim 6, wherein said set welding parameter including a set or selected arc length, said monitored welding parameter including the arc voltage.

8. The improvement as defined in claim 2, wherein said pulse width modulator is operated at a frequency of less than about 1 kHz.

9. The improvement as defined in claim 8, wherein said power supply is a switching type operated at a frequency of greater than about 20 kHz.

10. The improvement as defined in claim 2, wherein said set welding parameter including a set or selected arc length, said monitored welding parameter including the arc voltage.

11. The improvement as defined in claim 1, wherein said switch operating network includes a signal generator for creating said first and second switch signals.

12. The improvement as defined in claim 1, wherein said switch operating network controls the relative time of said first and second switch signal.

13. The improvement as defined in claim 12, wherein said switch operating network is a pulse width modulator with an output having a controlled duty cycle, said output creating one of said switch signals and an inverter for converting said one switch signal to the other of said switch signals.

14. The improvement as defined in claim 12, including means for creating a CTWD signal by comparing said relative time of said first and second switch signal.

15. The improvement as defined in claim 1, wherein said power supply is a switching type operated at a frequency of greater than about 20 kHz.

16. The improvement as defined in claim 1, wherein said set welding parameter including a set or selected arc length, said monitored welding parameter including the arc voltage.

17. In an electric arc welder for creating an arc welding process between a consumable electrode advancing through a contact tip and a workpiece, said welder including a power supply to create an arc current and arc voltage and having a first lead connected to said contact tip and a second lead connected to said workpiece, the improvement comprising: said contact tip including an upper tip section and a lower tip section and an insulator that electrically isolates said upper and lower sections, a first switch selectively shiftable between a conductive state and a nonconductive state, said conductive state connecting first lead to said upper tip section, a second switch selectively shiftable between a conductive state and a nonconductive state, said conductive state connecting said first lead to said lower tip section, and a switch operating network creating a first switch signal to shift said first switch to its conductive state and/or a second switch signal to shift said second switch to its conductive state to control the effective CTWD of said arc welding process said switch operating network including a pulse width modulator with an output having a controlled duty cycle, said output creating one of said switch signals and an inverter for converting said one switch signal to the other of said switch signals, said control circuit creating an output with a duty cycle signal for adjusting said duty cycle to control the effective CTWD, said control circuit controlling the magnitude of said duty cycle signal on said output by a comparison of a signal representative of the desired arc length and the arc voltage.

18. The improvement as defined in claim 17, including means for reading said duty cycle to create a CTWD signal.

19. In an electric arc welder for creating an arc welding process between a consumable electrode advancing through a contact tip and a workpiece, said welder including a power supply to create an arc current and arc voltage and having a first lead connected to said contact tip and a second lead connected to said workpiece, the improvement comprising: said contact tip including an upper tip section and a lower tip section and an insulator that electrically isolates said upper and lower sections, a first switch selectively shiftable between a conductive state and a nonconductive state, said conductive state connecting first lead to said upper tip section, a second switch selectively shiftable between a conductive state and a nonconductive state, said conductive state connecting said first lead to said lower tip section, and a switch operating network creating a first switch signal to shift said first switch to its conductive state and/or a second switch signal to shift said second switch to its conductive state to control the effective CTWD of said arc welding process, said switch operating network is a signal generator for creating said first and second switch signals, said switch operating network causing said first and second switch signals to coincide for a period of about 5–30 microseconds.

20. In an electric arc welder for creating an arc welding process between a consumable electrode advancing through a contact tip and a workpiece, said welder including a power supply to create an arc current and arc voltage and having a first lead connected to said contact tip and a second lead connected to said workpiece, the improvement comprising: said contact tip including an upper tip section and a lower tip section and an insulator that electrically isolates said upper and lower sections, a first switch selectively shiftable between a conductive state and a nonconductive state, said conductive state connecting first lead to said upper tip section, a second switch selectively shiftable between a conductive state and a nonconductive state, said conductive state connecting said first lead to said lower tip section, and a switch operating network creating a first switch signal to shift said first switch to its conductive state and/or a second switch signal to shift said second switch to its conductive state to control the effective CTWD of said arc welding process, said switch operating network is a signal generator for creating said first and second switch signals, said switch operating network generating said first and second switch signals at the start of said arc welding process.

21. A method for creating an arc welding process between a consumable electrode advancing through a contact tip and a workpiece using a power supply to create an arc current and arc voltage and having a first lead connected to said contact tip and a second lead connected to said workpiece, said method comprising:
   (a) dividing said contact tip into an upper tip section and a spaced lower tip section electrically isolated from said upper section;
   (b) selectively connecting one of said leads to a selected one or both of said contact tips to control the effective CTWD; and,
   (c) controlling the selective connection of said leads by comparing a set welding parameter to a monitored welding parameter.

22. The method as defined in claim 21, wherein the duty cycle of said selective connection of said leads comprises the relative time said top sections are connected to said one lead and including the further act of adjusting said duty cycle to control said CTWD.

23. The method as defined in claim 22, wherein said duty cycle has a period created by an operating frequency of less than about 1 kHz.

24. The method as defined in claim 23, wherein said power supply is a switching type operated at a frequency of greater than about 20 kHz.

25. The method as defined in claim 22, including creating a CTWD signal based upon said duty cycle.

26. The method as defined in claim 25, including changing the position of said electrode based upon said CTWD signal.

27. The method as defined in claim 25, wherein said set welding parameter including a set or selected arc length, said monitored welding parameter including the arc voltage.

28. The method as defined in claim 27, including the maintaining of a substantially constant heat input to said consumable electrode during said arc welding process.

29. The method as defined in claim 28, including the maintaining of a substantially constant arc voltage during said arc welding process.

30. The method as defined in claim 27, including the maintaining of a substantially constant arc voltage during said arc welding process.

31. The method as defined in claim 25, including the maintaining of a substantially constant heat input to said consumable electrode during said arc welding process.

32. The method as defined in claim 31, including the maintaining of a substantially constant arc voltage during said arc welding process.

33. The method as defined in claim 25, including the maintaining of a substantially constant arc voltage during said arc welding process.

34. The method as defined in claim 22, wherein said set welding parameter including a set or selected arc length, said monitored welding parameter including the arc voltage.

35. The method as defined in claim 34, including the maintaining of a substantially constant heat input to said consumable electrode during said arc welding process.

36. The method as defined in claim 35, including the maintaining of a substantially constant arc voltage during said arc welding process.

37. The method as defined in claim 34, including the maintaining of a substantially constant arc voltage during said arc welding process.

38. The method as defined in claim 22, including the maintaining of a substantially constant heat input to said consumable electrode during said arc welding process.

39. The method as defined in claim 38, including the maintaining of a substantially constant arc voltage during said arc welding process.

40. The method as defined in claim 22, including the maintaining of a substantially constant arc voltage during said arc welding process.

41. The method as defined in claim 21, wherein said power supply is a switching type operated at a frequency of greater than about 20 kHz.

42. The method as defined in claim 21, wherein said set welding parameter including a set or selected arc length, said monitored welding parameter including the arc voltage.

43. The method as defined in claim 42, including the maintaining of a substantially constant heat input to said consumable electrode during said arc welding process.

44. The method as defined in claim 43, including the maintaining of a substantially constant arc voltage during said arc welding process.

45. The method as defined in claim 42, including the maintaining of a substantially constant arc voltage during said arc welding process.

46. The method as defined in claim 21, including the maintaining of a substantially constant heat input to said consumable electrode during said arc welding process.

47. The method as defined in claim 46, including the maintaining of a substantially constant arc voltage during said arc welding process.

48. The method as defined in claim 21, including the maintaining of a substantially constant arc voltage during said arc welding process.

49. A torch for electric arc welding comprising an outer housing, a contact tip for directing electrical current to a consumable electrode passing through said contact tip toward a workpiece, an electrical insulator, and a gas passageway, said contact tip comprising an upper tip section, a lower tip section, said electrical insulator electrically isolating said tip sections whereby current is electively directed to one or both of said tip sections to control the effective CTWD of said torch, said electrical insulator including an air gap and an electrically insulted spacer at least partially positioned in said air gap, said gas passageway at least partially defined between said electrically insulted spacer and said outer housing.

50. The torch as defined in claim 49, including a first switch for directing current to said upper tip section, a second switch for directing current to said lower tip section and a switch control network to selectively operate said switches.

51. The torch as defined in claim 50, wherein said switch control network includes a first output signal operating said first switch, a second output signal operating said second switch and a control circuit that compares a set welding parameter to a monitored welding parameter and causes said switch operating network to create said first or second outputswitch signal based on said comparison.

52. The torch as defined in claim 51, wherein said switch control network includes a circuit for controlling the duty cycle between said output signals, said duty cycle has a period created by an operating frequency of less than about 1 kHz.

53. The torch as defined in claim 52, wherein said period is in the general range of 1–5 ms.

54. In an electric arc welder for creating an arc welding process between a consumable electrode advancing through a contact tip and a workpiece, said welder including a power supply to create an arc current and arc voltage and having a first lead connected to said contact tip and a second lead connected to said workpiece, the improvement comprising: said contact tip including an upper tip section and a lower tip section and an insulator that electrically isolates said upper and lower sections, a first switch selectively shiftable between a conductive state and a nonconductive state, said conductive state connecting first lead to said upper tip section, a second switch selectively shiftable between a conductive state and a nonconductive state, said conductive state connecting said first lead to said lower tip section, and a switch operating network creating a first switch signal to shift said first switch to its conductive state and/or a second switch signal to shift said second switch to its conductive state to control the effective CTWD of said arc welding process, said switch operating network controlling the state of the first and second switch so as to maintain a substantially constant heat input to said consumable electrode during said arc welding process.

55. The improvement as defined in claim 54, wherein said switch network controlling the state of the first and second switch so as to maintain a substantially constant arc voltage during said arc welding process.

56. The improvement as defined in claim 55, said switch network including a control circuit that compares a set welding parameter to a monitored welding parameter and cause said switch operating network to create a first or second switch signal based on said comparison.

57. The improvement as defined in claim 56, wherein said set welding parameter including a set or selected arc length, said monitored welding parameter including the arc voltage.

58. The improvement as defined in claim 57, wherein said switch operating network includes a pulse width modulator with an output having a controlled duty cycle, said output creating one of said switch signals and an inverter for converting said one switch signal to the other of said switch signals.

59. The improvement as defined in claim 57, wherein said switch operating network includes a signal generator for creating said first and second switch signals.

60. The improvement as defined in claim 59, wherein said switch operating network causing said first and second switch signals to coincide for a period of about 5–30 microseconds.

61. The improvement as defined in claim 54, said switch network including a control circuit that compares a set welding parameter to a monitored welding parameter and cause said switch operating network to create a first or second switch signal based on said comparison.

62. The improvement as defined in claim 61, wherein said set welding parameter including a set or selected arc length, said monitored welding parameter including the arc voltage.

63. The improvement as defined in claim 54, wherein said switch operating network includes a pulse width modulator with an output having a controlled duty cycle, said output creating one of said switch signals and an inverter for converting said one switch signal to the other of said switch signals.

64. The improvement as defined in claim 54, wherein said switch operating network includes a signal generator for creating said first and second switch signals.

65. The improvement as defined in claim 54, wherein said switch operating network causing said first and second switch signals to coincide for a period of about 5–30 microseconds.

* * * * *